United States Patent
Rasberger et al.

[11] Patent Number: 6,046,263
[45] Date of Patent: Apr. 4, 2000

[54] LIQUID ANTIOXIDANTS AS STABILIZERS

[75] Inventors: Michael Rasberger, Riehen; Samuel Evans, Marly; Paul Dubs, Fribourg; Stephan Allenbach, Düdingen, all of Switzerland

[73] Assignee: Ciba Specialty Chemicals Corporation, Tarrytown, N.Y.

[21] Appl. No.: 09/081,432

[22] Filed: May 19, 1998

[51] Int. Cl.[7] .............................. C08K 5/09; C08K 15/04
[52] U.S. Cl. .................. 524/284; 528/271; 528/287; 528/288; 528/289; 528/290; 528/293; 524/291; 524/315; 524/366; 524/499; 524/539; 252/399; 252/401; 252/404; 252/405; 252/406; 252/407
[58] Field of Search ........................ 528/271, 287, 528/288, 289, 290, 293; 524/284, 291, 315, 499, 366, 539; 252/399, 401, 404, 405, 406, 407

[56] References Cited

U.S. PATENT DOCUMENTS

| | | |
|---|---|---|
| 3,839,278 | 10/1974 | Dexter et al. . |
| 4,032,562 | 6/1977 | Dexter et al. . |
| 4,093,587 | 6/1978 | Spinack . |
| 4,132,702 | 1/1979 | Schmidt et al. . |
| 5,478,875 | 12/1995 | Dubs et al. . |
| 5,663,128 | 9/1997 | Evans et al. . |

FOREIGN PATENT DOCUMENTS 9113134   9/1991   WIPO .

OTHER PUBLICATIONS

Research Disclosure 38420 (Apr. 1996, No. 384).

*Primary Examiner*—Samuel A. Acquah
*Attorney, Agent, or Firm*—Luther A. R. Hall

[57] ABSTRACT

Products are described which are obtainable by reacting compounds of formula I with compounds of formula IIa or/and IIb and IIIa or/and IIIb and additionally, where appropriate, IV

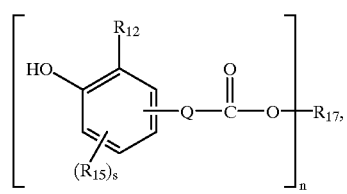
(I)

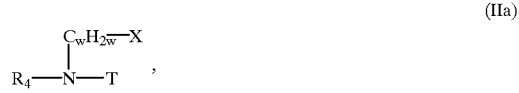

(IIa)

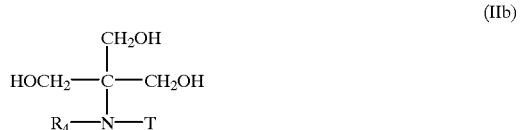

(IIb)

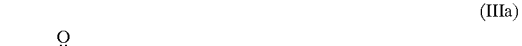

(IIIa)

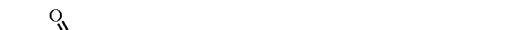

(IIIb)

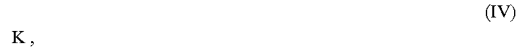

(IV)

wherein the general symbols are as defined in claim 1, the compound of formula I being, for example, methyl 3-(3',5'-di-tert-butyl-4'-hydroxyphenyl)propionate, the compound of formula IIa being, for example, diethanolamine, the compound of formula IIIa being, for example, methyl oleate, and the compound of formula IV being, for example, sulfur. The cited products can be used as liquid antioxidants in organic materials.

13 Claims, No Drawings

LIQUID ANTIOXIDANTS AS STABILIZERS

The present invention relates to novel liquid and low-volatility antioxidants, to compositions comprising a synthetic polymer or an oil and the novel low-volatility liquid antioxidants, as well as to the use thereof for stabilising organic materials against oxidative, thermal or light-induced degradation.

The stabilisation of, in particular, lubricants or plastics using antioxidants from the series of the sterically hindered phenols is known, inter alia, from U.S. Pat. Nos. 3,839,278; 4,032,562; 4,058,502, 4,093,587 or 4,132,702.

WO 91/13134 describes a method for improving the solubility of antioxidants in a second medium in which the antioxidants are sparingly soluble. For example, a sterically hindered 3-phenylpropionate is reacted with sunflower oil. In the case of these reaction products, the antioxidants are chemically covalently combined with the second medium.

The use of fatty acids and the esters thereof as additives in lubricating oils,is know. For example, glycerol monooleate is commercially available for this purpose.

U.S. Pat. No. 5,478,875 describes reaction products from (i) alcohols or amines, such as glycerol or diethanolamine, (ii) glycerol esters, such as sunflower oil, and (iii) antioxidants, such as methyl 3-(3',5'-di-tert-butyl-4'-hydroxyphenyl)propionate. These products may be used as liquid antioxidants in polymers and lubricants. As emerges from Research Disclosure 38420, April 1996, these products also have an excellent friction-reducing effect in motor oil ("friction modifiers") which is superior to that of glycerol monooleate.

EP-A-0 644 195 describes reactions of similar components as those in U.S. Pat. No. 5,478,875, additionally using sulfur.

Stabilisers having low oxidation sensitivity are still being searched for. Owing to the degradation of the stabilisers, the friction-reducing effect of stabilisers is lost over time when the motor is used. Since the recommended intervals for oil changes are getting longer and longer, the industry is looking for particularly stable friction-reducing systems.

It has now ben found that the inventive reaction products described hereinafter in more detail have excellent friction-reducing properties in addition to their antioxidative effect. They remain stable in the substrate for much longer than e.g. customary polyol derivatives.

This invention relates to products, which are obtainable by reacting compounds of formula I with compounds of formula IIa or/and IIb and IIIa or/and IIIb as well as additionally, where appropriate, IV

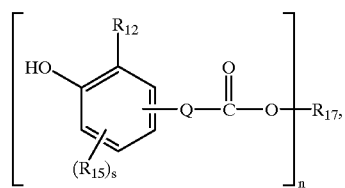
(I)

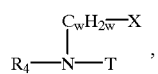
(IIa)

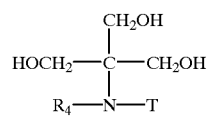
(IIb)

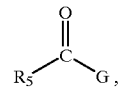
(IIIa)

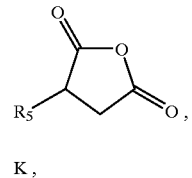
(IIIb)

K,
(IV)

wherein in the compound of formula I $R_{12}$ is $C_1$–$C_{12}$alkyl, $C_5$–$C_{12}$cycloalkyl, phenyl or $C_7$–$C_9$phenylalkyl, $R_{15}$ is hydrogen, $C_1$–$C_{18}$alkyl, $C_1$–$C_{12}$cycloalkyl, phenyl or $C_7$–$C_9$phenylalkyl, Q is —$C_mH_{2m}$—,

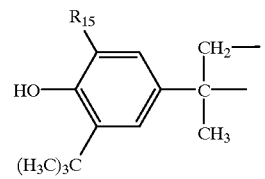

or —$(CH_2)_a$—S—$(CH_2)_b$—, a is a number from 0 to 3,
b is 1 or 2,
m is a number from 0 to 3,
n is a number from 1 to 6,
s is 0, 1 or 2, and
if n=1, $R_{17}$ is hydrogen, $C_1$–$C_{45}$alkyl, $C_5$–$C_{12}$cycloalkyl, $C_2$–$C_{18}$alkenyl, —$CH_2CH_2$—$R_{10}$—$R_1$ or

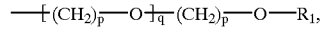

$R_1$ is hydrogen, $C_1$–$C_{24}$alkyl or $C_5$–$C_{12}$cycloalkyl,
$R_{10}$ is oxygen, sulfur or >N—$R_2$,
$R_2$ is $C_1$–$C_{18}$alkyl; phenyl which is unsubstituted or substituted by $C_1$–$C_{18}$alkyl, hydroxy or methoxy,
p is 2, 3 or 4,
q is a number from 2 to 20, and
if n=2,
$R_{17}$ is a divalent hexose radical or hexite radical,

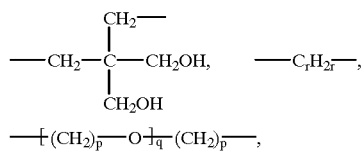

-continued

—CH$_2$—CH=CH—CH$_2$—,

—CH$_2$—C≡C—CH$_2$—,

—CH$_2$CH$_2$—R$_{10}$—CH$_2$CH$_2$—,

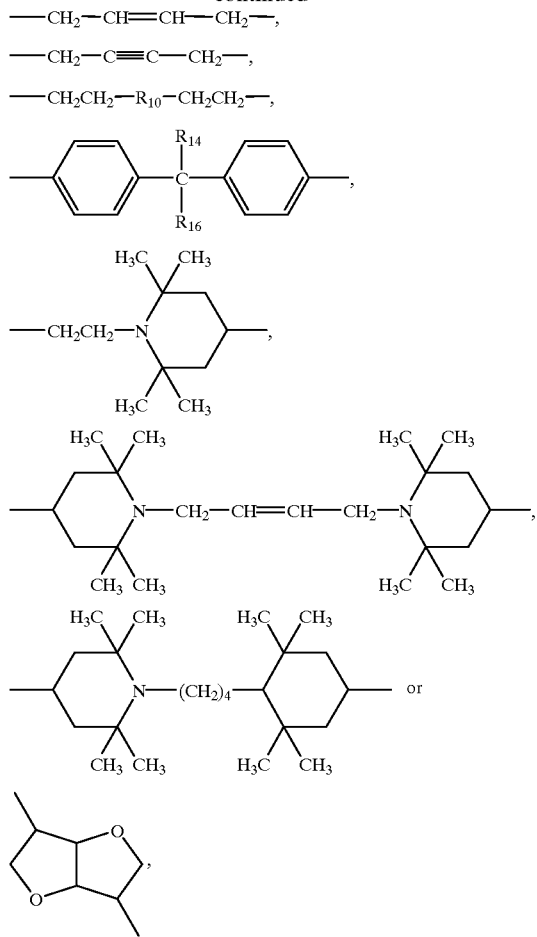

$R_{10}$ is oxygen, sulfur or >N—R$_2$, $R_{14}$ and $R_{16}$ are each independently of the other hydrogen or $C_1$–$C_{12}$alkyl, or $R_{14}$ and $R_{16}$, together with the linking carbon atom, are a $C_5$–$C_8$cycloalkylidene ring, r is a number from 2 to 10, and if n=3, $R_{17}$ is a trivalent hexose radical or hexite radical,

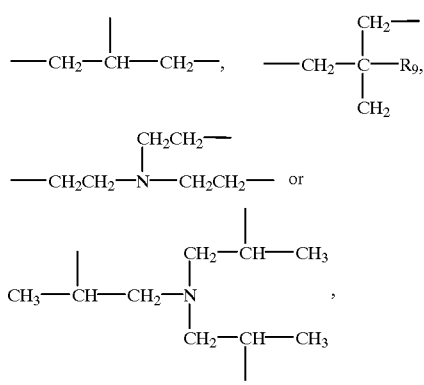

$R_9$ is hydrogen, —CH$_2$OH or $C_1$–$C_4$alkyl, and if n=4, $R_{17}$ is a tetravalent hexose radical or hexite radical, $C_4$–$C_{10}$alkanetetrayl,

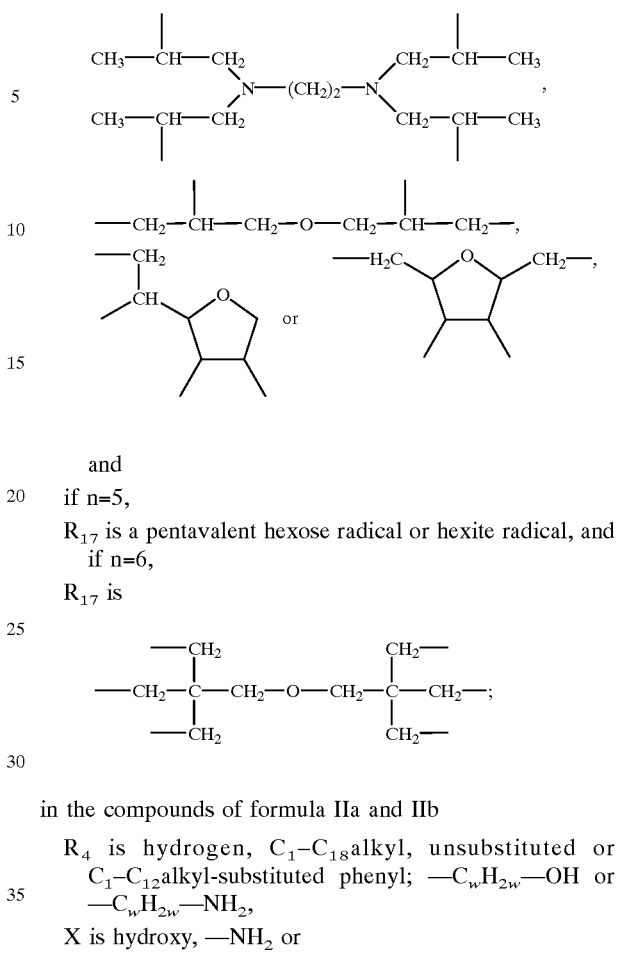

and if n=5, $R_{17}$ is a pentavalent hexose radical or hexite radical, and if n=6, $R_{17}$ is in the compounds of formula IIa and IIb $R_4$ is hydrogen, $C_1$–$C_{18}$alkyl, unsubstituted or $C_1$–$C_{12}$alkyl-substituted phenyl; —C$_w$H$_{2w}$—OH or —C$_w$H$_{2w}$—NH$_2$, X is hydroxy, —NH$_2$ or —Y—[C$_w$H$_{2w}$—Y]$_c$—C$_w$H$_{2w}$—R$_{13}$, $R_{13}$ is hydroxcy or —NH$_2$, Y is oxygen or >NH, c is a number from 0 to 6, w is a number from 2 to 6, T is hydrogen or —C$_w$H$_{2w}$—X, with the proviso that at least one >NH group each is present in the compounds of formula IIa and IIb;

in the compounds of formula IIIa and IIIb

G is chloro, bromo or —OR$_6$, $R_5$ is hydrogen, $C_1$–$C_{30}$alkyl, $C_8$–$C_{30}$alkenyl, phenyl, $C_7$–$C_9$phenylalkyl, $C_5$–$C_{12}$cycloalkyl, —C$_d$H$_{2d}$—S—R$_8$, $C_8$–$C_{22}$hydroxyalkenyl,

—(CH$_2$)$_7$—C=CH—(CH$_2$)$_7$—CH$_3$,

G—C(=O)—(CH$_2$)$_f$—CH—(CH$_2$)$_f$—CH$_3$

—(CH$_2$)$_7$—CH=C—(CH$_2$)$_7$—CH$_3$

G—C(=O)—(CH$_2$)$_f$—CH—(CH$_2$)$_f$—CH$_3$,

—C$_x$H$_{2x}$—C(=O)—O—R$_6$,

-continued

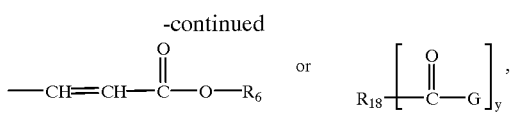

R₆ is hydrogen, $C_1$–$C_{18}$alkyl, $C_8$–$C_{30}$alkenyl, $C_5$–$C_{12}$cycloalkyl, phenyl or $C_7$–$C_9$phenylalkyl, R₈ is $C_4$–$C_{12}$alkyl, phenyl or $C_5$–$C_8$cycloalkyl, d is 0, 1, 2 or 3, f is 7 or 8, x is a number from 2 to 8, y is 3 or 4, and if y=3, R₁₈ is $C_3$–$C_{18}$alkanetriyl or $C_6$–$C_8$cycloalkanetriyl, and if y=4, R₁₈ is $C_3$–$C_{18}$alkanetetrayl or $C_6$–$C_8$cycloalkanetetrayl, and in the compound of formula IV K is sulfur, R₁₉—SH,

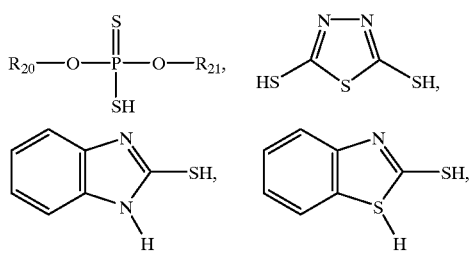

$C_{12}$–$C_{30}$alkane or $C_{18}$–$C_{36}$phenylalkane,

R₁₉ is $C_1$–$C_{18}$alkyl, $C_7$–$C_{24}$phenylalkyl, phenyl, $C_7$–$C_{24}$alkylphenyl, unsubstituted or $C_1$–$C_4$alkyl-substituted $C_5$–$C_{12}$cycloalkyl; and R₂₀ and R₂₁ are each independently of the other $C_1$–$C_{18}$alkyl, unsubstituted or $C_1$–$C_{18}$alkyl-substituted phenyl.

Alkyl of up to 45 carbon atoms is a branched or unbranched radical, typically methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyll, 3-methylheptyl, n-octyl, 2-ethylhexyl, 1,1,3-trimethylhexyl, 1,1,3,3-tetramethylpentyl, nonyl, decyl, undecyl, 1-methylandecyl, dodecyl, 1,1,3,3,5,5-hexamethylhexyl, tridecyl, tetradecyl, pentadecyl, hexadecyl, heptadecyl, octadecyl, eicosyl, docosyl or pentacosyl. A preferred meaning of R₁₂ and R₁₅ is $C_1$–$C_{12}$alkyl, more preferably $C_1$–$C_8$alkyl, e.g. $C_1$–$C_6$alkyl. A particularly preferred meaning of R₁₂ and R₁₅ is $C_1$–$C_4$alkyl, more preferably methyl and tert-butyl. A preferred meaning of R₁₇ is $C_1$–$C_{30}$alkyl, more preferably $C_1$–$C_{25}$alkyl, e.g. $C_1$–$C_{18}$alkyl. A preferred meaning of R₁ and R₂ is $C_1$–$C_{18}$alkyl, more preferably $C_1$–$C_{12}$alkyl, e.g. $C_1$–$C_6$alkyl. A particularly preferred meaning of R₁ and R₂ is $C_1$–$C_4$alkyl, more preferably methyl and ethyl. A preferred meaning of R₁₄ and R₁₆ is $C_1$–$C_8$alkyl, more preferably $C_1$–$C_6$alkyl, e.g. $C_1$–$C_4$alkyl, typically methyl. A preferred meaning of R₄, R₅ and R₆ is $C_1$–$C_{18}$alkyl, more preferably $C_1$–$C_{12}$alkyl, e.g. $C_1$–$C_8$alkyl. A particularly preferred meaning of R₄, R₅ and R₆ is $C_1$–$C_6$-alkyl, more preferably $C_1$–$C_4$alkyl, e.g. n-butyl. A preferred meaning of R₁₉, R₂₀ and R₂₁ is $C_1$–$C_{12}$alkyl, more preferably $C_1$–$C_{10}$alkyl, e.g. $C_1$–$C_8$alkyl.

Unsubstituted or $C_1$–$C_4$alkyl-substituted $C_5$–$C_{12}$cycloalkyl is typically cyclopentyl, methylcyclopentyl, dimethylcyclopentyl, cyclohexyl, methylcyclohexyl, dimethylcyclohexyl, trimethylcyclohexyl, tert-butylcyclohexyl, cycloheptyl, cyclooctyl, cyclononyl, cyclodecyl, cycloundecyl or cyclododecyl. Cyclohexyl and tert-butylcyclohexyl are preferred.

Phenylalkyl containing 7 to 24 carbon atoms is, for example, benzyl, α-methylbenzyl, α,α-di-methylbenzyl, 2-phenylethyl, 3-phenylpropyl, 4-phenylbutyl, 5-phenylpentyl, 6-phenylhexyl, 7-phenylheptyl, 8-phenyloctyl, 9-phenylnonyl, 10-phenyidecyl, 11-phenylandeceyl, 12-phenyldodecyl, 13-phenyltridecyl, 14-phenyltetradecyl, 15-phenylpentadecyl, 16-phenylhexadecyl, 17-phenylheptadecyl or 18-phenyloctadecyl. A preferred meaning of R₅, R₆, R₁₂ and R₁₅ is benzyl. A preferred meaning of R₁₉ is $C_{10}$–$C_{24}$phenylalkyl, in particular $C_{14}$–$C_{24}$phenylalkyl, e.g. $C_{18}$–$C_{24}$phenylalkyl.

Alkenyl containing up to 30 carbon atoms containing one or several C—C double bonds and is typically vinyl, propenyl, isopropenyl, 2-butenyl, 3-butenyl, isobutenyl, n-penta-2,4-dienyl, 3-methyl-but-2-enyl, n-oct-2-enyl, n-dodec-2-enyl, iso-dodecenyl, oleyl, n-octadec-2-enyl or n-octadec-4-enyl.

Phenyl which is substituted by $C_1$–$C_{18}$alkyl, hydroxy or methoxy and which contains preferably 1 to 3, in particular 1 or 2, substituents is typically o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl, p-methoxyphenyl, 3-hydroxy-4-methoxyphenyl or 2,6-diethylphenyl. $C_1$–$C_{12}$Alkyl-substituted phenyl, in particular $C_4$–$C_8$alkyl-substituted phenyl, is preferred.

A $C_5$–$C_8$cycloalkylidene ring is, for example, cyclopentylidene, cyclohexylidene, cycloheptylidene or cyclooctylidene. Cyclohexylidene is preferred.

Alkanetriyl, alkanetetrayl and alkanepentayl are derived from an alkane containing 3 to 18 carbon atoms, wherein 3 to 5 hydrogen atoms are missing.

$C_6$–$C_8$Cycloalkanetriyl and $C_6$–$C_8$cycloalkanetetrayl are derived from cyclohexane, cycloheptane and cyclooctane, wherein 3 or 4 hydrogen atoms are missing.

n-Valent radicals of hexose are derived, for example, from allose, altrose, glucose, mannose, gulose, idose, galactose or talose ab, which means that one, two, three, four, five or six —OH groups must be replaced with the ester group E-1,

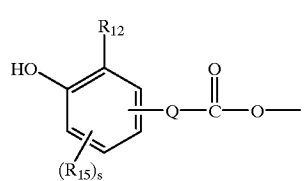

(E-1)

to obtain the corresponding compounds of formula I.

n-Valent radicals of hexite are obtained by replacing n OH-groups with an ester group E-1 indicated above.

Hydroxyalkenyl containing 8 to 22 carbon atoms contains one or several C—C double bonds and one or several OH-groups and is typically

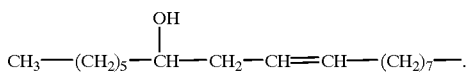

$C_{12}$–$C_{30}$Alkane is a branched or unbranched hydrocarbon, such as dodecane, tetradecane, octadecane, eicosane or docosane.

$C_{18}$–$C_{36}$Phenylalkane is a branched or unbranched hydrocarbon, for example phenyldodecane, phenyltetradecane, phenyloctadecane, phenyleicosane or phenyldocosane.

$C_7$–$C_{24}$Alkylphenyl is a phenyl ring which is substituted by 1, 2 or 3 branched or unbranched alkyl groups, such as methylphenyl, ethylphenyl, propylphenyl, butylphenyl, pentylphenyl, hexylphenyl, heptylphenyl, octylphenyl, nonylphenyl, decylphenyl, undecylphenyl, dodecylphenyl, tridecylphenyl, tetradecylphenyl, octacecylphenyl, eicosylphenyl or docosylphenyl.

A preferred object of this invention is to provide products, wherein in the compound of formula I $R_{12}$ is $C_1$–$C_8$alkyl, cyclohexyl or phenyl,
$R_{15}$ is hydrogen, $C_1$–$C_{12}$alkyl, cyclohexyl or phenyl,
Q is —$C_mH_{2m}$— or —$(CH_2)_a$—S—$(CH_2)_b$—,
a is 1,
b is 1,
m is 2,
n is a number from 1 to 4,
s is 1 or 2, and
if n=1,
$R_{17}$ is hydrogen, $C_1$–$C_{18}$alkyl, cyclohexyl, allyl, —$CH_2CH_2$—$R_{10}$—$R_1$ or

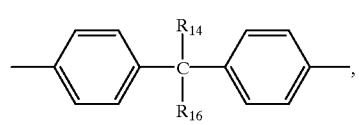

$R_1$ is hydrogen, $C_1$–$C_{12}$alkyl or cyclohexyl,
$R_{10}$ is oxygen, sulfur or >N—$R_2$,
$R_2$ is $C_1$–$C_{12}$alkyl or phenyl,
p is 2 or 4,
q is a number from 2 to 10, and
if n=2,
$R_{17}$ is a divalent hexose or hexite radical,

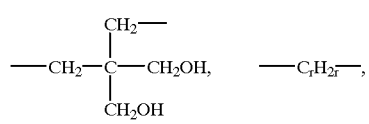

$R_{10}$ is oxygen, sulfur or >N—$R_2$,
$R_{14}$ and $R_{16}$ are each independently of the other hydrogen or $C_1$–$C_{12}$alkyl, or $R_{14}$ and $R_{15}$, together with the linking carbon atom, form a cyclohexylidene ring,
r is a number from 2 to 10, and
if n=3, $R_{17}$ is a trivalent hexose or hexite radical,

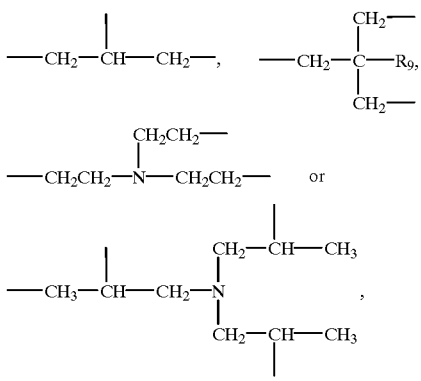

$R_9$ is hydrogen, —$CH_2OH$ or $C_1$–$C_4$alkyl, and
if n=4,
$R_{17}$ is a tetravalent hexose or hexite radical, $C_4$–$C_{10}$alkanetetrayl or

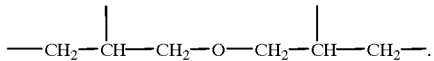

Another preferred object of this invention is to provide products, wherein in the compound of formula I $R_{12}$ is tert-butyl,
$R_{15}$ is $C_1$–$C_4$alkyl and is bound in ortho-position to the OH-group,
Q is —$C_mH_{2m}$— or —$(CH_2)_a$—S—$(CH_2)_b$—,
a is 1,
b is 1,
m is 2,
n is 1 or 4,
s is 1, and
if n=1,
$R_{17}$ is $C_1$–$C_{18}$alkyl, and
if n=4,
$R_{17}$ is

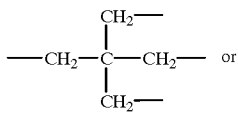

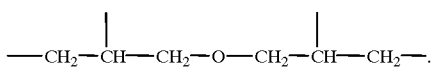

A particularly preferred object of this invention is to provide products, wherein in the compounds of formula IIa and IIb $R_4$ is hydrogen, $C_1$–$C_{12}$alkyl, unsubstituted or $C_1$–$C_4$alkyl-substituted phenyl; —$C_wH_{2w}$—OH or —$C_wH_{2w}$—$NH_2$,
X is hydroxy, —$NH_2$ or

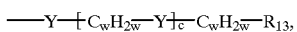

$R_{13}$ is hydroxy or —$NH_2$,
Y is oxygen or >NH
c is a number from 0 to 4, w is a number from 2 to 4, T is hydrogen or —$C_wH_{2w}$—X, with the proviso that at least one >NH group each is present in the compounds of formula IIa and IIb.

A preferred object of this invention is also to provide products, wherein in the compounds of formula IIIa and IIIb G is —$OR_6$, $R_5$ is hydrogen, $C_1$–$C_{18}$alkyl, $C_8$–$C_{22}$alkenyl, phenyl, benzyl, cyclohexyl, $C_8$–$C_{22}$hydroxyalkenyl,

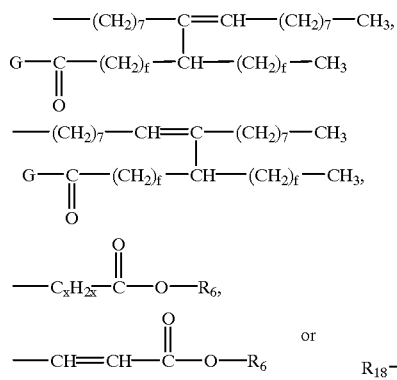

$R_6$ is hydrogen, $C_1$–$C_{18}$alkyl, $C_8$–$C_{22}$alkenyl, cyclohexyl, phenyl or benzyl, f is 7 or 8, x is a number from 2 to 6, y is 3 or 4, and if y=3, $R_{18}$ is $C_3$–$C_{12}$alkanetriyl or cyclohexantriyl, and if y=4, $R_{18}$ is $C_3$–$C_{12}$alkanetetrayl or cyclohexantetrayl.

Another preferred object of this invention is to provide products, wherein in the compound of formula IV K is sulfur,

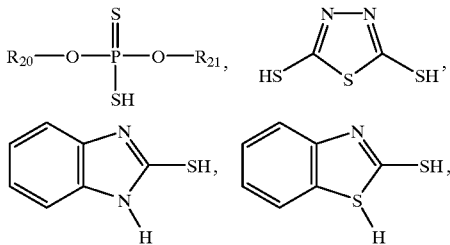

$C_{12}$–$C_{30}$alkane or $C_{18}$–$C_{36}$phenylalkane, and $R_{20}$ and $R_{21}$ are each independently of the other $C_1$–$C_{12}$alkyl, unsubstituted or $C_1$–$C_4$alkyl-substituted phenyl.

Preferred compounds of formula I are, for example, (Ia)

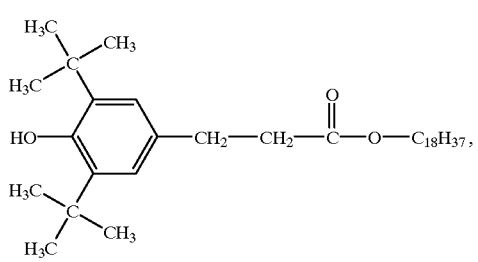

Irganox® 1076

(Ib)

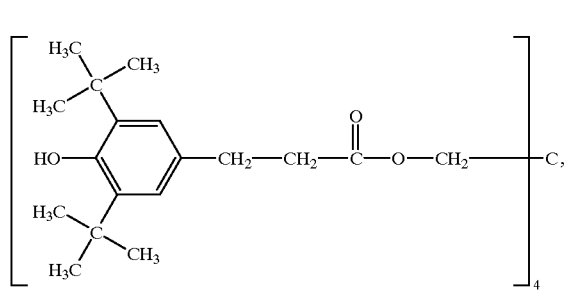

Irganox® 1010

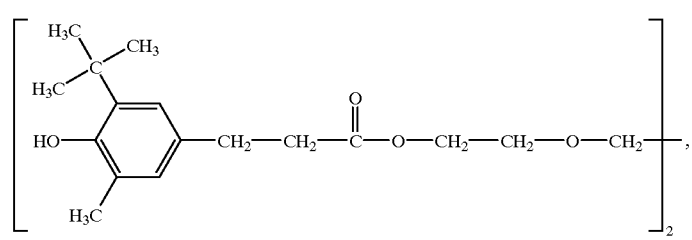

Irganox® 245

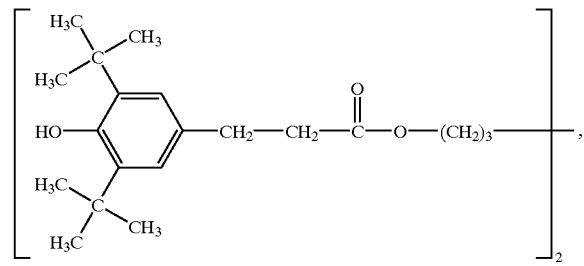

Irganox® 259

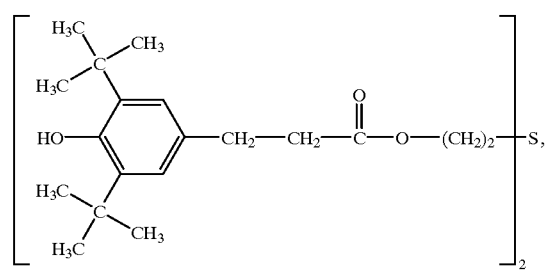

Irganox® 1035

IRGANOX, e.g. Irganox®1076, Irganox®1010, Irganox®245, Irganox®259 and Irganox®1035 are trademarks of Ciba Spezialitatenchemie AG.

Preferred compounds of formula Iha or IIb are, for example, diethanolamine, N-phenylethanolamine, ethanolamine, $H_2N-CH_2CH_2-NH-CH_2CH_2-OH$,

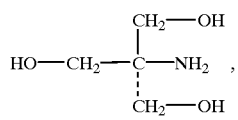

$H_2N-CH_2CH_2-NH-CH_2CH_2-NH_2$, $H_2N-(CH_2)_2-NH-(CH_2)_2-NH-(CH_2)_2-NH_2$ or $H_2N-(CH_2)_6-NH-(CH_2)_6-NH_2$.

Particularly preferred compounds of formula IIIa are, for example, methyl oleate and stearic acid.

The reaction can be carried out in different manner: the compounds of formula I and IIIa/IIIb, I and IIa/IIIb, or IIa/IIb and IIIa/IIIb can each form an intermediate which is then reacted with IIa/IIIb, IIIa/IIIb or I (2-step process), or 1, IIa/IIb and IIIa/IIIb can be reacted together (multi-component reaction):

The reaction can be accelerated by heating or with a catalyst. Depending on the type of reaction, the one or the other is preferred.

During amidation (IIa/IIb+IIIa/IIIb or I+IIa/IIb) the temperature is preferably raised. During transesterification ($R_{17}\neq H$, in particular $R_{17}=CH_3$; I+IIa/IIb, X=OH) it is preferred to work in the presence of a catalyst, in particular of a basic catalyst, from the group of the metal hydrides, metal alkylides, metal arylides, metal hydroxides, metal alcoholates, metal phenolates, metal amides or metal acetates. Particularly preferred catalysts are LiH, $LiNH_2$, KOH, NaOH, KOMe, NaOMe, KF, NaF. The catalysts may also be used on a carrier such as $AL_2O_3$, silicic acid, magnesium oxide or calcium oxide, or magnesium carbonate or calcium carbonate, e.g. dolomite.

Owing to the amine group in IIa/IIb, the esterification is carried out under acid conditions, for example in the presence of p-toluenesulfonic acid, of an acid clay, Brbnsted acids, such as $H_3PO_4$, HCl, $H_2SO_4$, of an acid ion exchanger, Lewis acids, such as boron trifluoride etherate, Lewis acids on carriers, or organo metal Lewis acid such as dibutyl tin oxide.

Suitable solvents are, for example, high-boiling paraffins, toluene, xylene, DMF, nitrobenzene. However, it is preferred to work without solvents. It is also possible to work first thermally and then catalytically in a one-pot process.

The reaction of components I, IIa/b, IIIa/b and optionally IV is conveniently carried out at a molar ratio of 10:1:10:(10) to 0.1:1:0.1:(0.1), preferably of 1:1:1:(1) to 3:1:4:(4).

For the reaction the individual components need not be used in stoichiometric amounts. The resultant products are mixtures of several products and, where present, unreacted starting materials which can be used direct as mixtures for the desired purpose.

In a preferred embodiment of this invention, the compounds of formula I can be prepared first in situ. The preparation of the compounds of formula I is carried out by known methods starting from the known phenols of formula IA

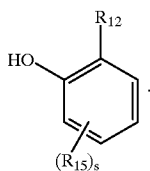
(IA)

The preparation, for example, of compounds of formula I, wherein Q is ethylene, is conveniently carried out e.g. by reacting the phenol of formula IA in a Michael addition with the acrylate of formula IB

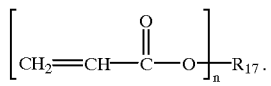
(IB)

The preparation, for example, of compounds of formula I, wherein Q is —CH$_2$—S—CH$_2$—, is conveniently carried out e.g. by reacting the phenol of formula IA with formaldehyde and a compound of formula IC

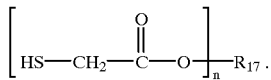
(IC)

As mentioned above, the products obtained are suitable for stabilising organic materials against oxidative, thermal or light-induced degradation. It is to be highlighted in particular that they are highly effective antioxidants for stabilising organic materials.

Illustrative examples of such materials are:

1. Polymers of monoolefins and diolefins, for example polypropylene, polyisobutylene, polybut-1-ene, poly-4-methylpent-1-ene, polyisoprene or polybutadiene, as well as polymers of cycioolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VII of the Periodic Table. These metals usually have one or more than one ligand, typically oxides, halides, alcoholates, esters, ethers, amines, alkyls, alkenyis and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylenepropylene copolymers, LDPE/ethylene-vinyl acetate copolymers (EVA), LDPE/ethyleneacrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example C$_5$–C$_9$) including hydrogenated modifications thereof (e.g. tackifiers) and mixtures of polyalkylenes and starch.

5. Polystyrene, poly(p-methylstyrene), poly(α-methylstyrene).

6. Copolymers of styrene or α-methylstyrene with dienes or acrylic derivatives, for example styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

7. Graft copolymers of styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetais thereof, for example polyvinyl alcohol, polyvinyl acetate, polyvinyl stearate, polyvinyl benzoate, polyvinyl maleate, polyvinyl butyral, polyailyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate and polyhydroxybenzoates, as well as block copolyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, ureas and melamines on the other hand, such as phenol/formaldehyde resins, urea/formaldehyde resins and melamine/formaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example epoxy acryiates, urethane acrylates or polyester acrylates.

25. Alkyd resins, polyester resins and acrylate resins crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

27. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

28. Blends of the aforementioned polymers (polyblends), for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

29. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.

30. Aqueous emulsions of natural or synthetic rubber, e.g. natural latex or latices of carboxylated styrene/butadiene copolymers.

This invention therefore also relates to compositions comprising (a) an organic material subject to oxidative, thermal or light-induced degradation, and (b) at leat one product which is obtainable by reacting compounds of formula I with compounds of formula IIa or/and IIb and IIa or/und IIIb and additionally, where appropriate, IV.

This invention thus also encompasses a process for stabilising and improving the performance properties of organic material against oxidative, thermal or light-induced degradation, which comprises adding to this material at least one product which is obtainable by reacting compounds of formula I with compounds of formula IIa or/and IIb and IIIa or/and IIIb and additionally, where appropriate, IV.

The use of these products as antioxidants in organic materials is particularly interesting.

Preferred organic materials are polymers, e.g. synthetic polymers, in particular thermoplastic polymers. Particularly preferred organic materials are polyolefins and styrene copolymers, e.g. those listed under items 1 to 3 and under items 6 and 7, in particular polyethylene and polypropylene as well as ABS and styrene/butadiene copolymers. A preferred object of this invention is therefore to provide compositions, wherein the organic material is a synthetic organic polymer or a mixture of such polymers, in particular a polyolefin or a styrene copolymer.

The products are usually added to the material to be stabilised in amounts of 0.01 to 10%, preferably of 0.01 bis 5%, more preferably of 0.01 to 2%, based on the total weight of the material to be stabilised.

In addition to the inventive products, the compositions of this invention can comprise standard additives such as those indicated below:

1. Antioxidants 1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-bu-tyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl) phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethyiphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonyiphenol.

1.3. Hydroquinones and alkylated hydroquinones, for example 2,6-di-tert-butyl-4-methoxy-phenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)-disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl) dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3, 5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, didodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis (octylmercapto)-6-(3,5-di-tert-butyl-4-hydroxyanilino)-1,3, 5-triazine, 2-octylmercapto-4,6-bis(3,5-di-tert-butyl-4-hydroxyanilino)-1,3,5-triazine, 2-octylmercapto-4,6-bis(3, 5-di-tert-butyl-4-hydroxyphenoxy)-1,3,5-triazine, 2,4,6-tris (3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6- hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanoli trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1 supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino) propane, (o-tolyl)biguanide, bis[4-(1',3'-dimethylbutyl) phenyl]amine, tertoctylated N-phenyl-1-naphthylamine, a mixture of mono- and dialkylated tert-butyl/tert-octyldiphenylamines, a mixture of mono- and dialkylated nonyidiphenylamines, a mixture of mono- and dialkylated dodecyidiphenylamines, a mixture of mono- and dialkylated isopropyl/isohexyldiphenylamines, a mixture of mono- and dialkylated tert-butyidiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octyl-phenothiazines, N-allylphenothiazin, N,N,N',N'-tetraphenyl-1,4-diaminobut-2-ene, N,N-bis(2,2,6,6-tetramethylpiperid-4-yl-hexamethylenediamine, bis(2,2,6,6-tetramethylpiperid-4-yl) sebacate, 2,2,6,6-tetramethylpiperidin-4-one, 2,2,6,6-tetramethylpiperidin-4-ol.

2. UV Absorbers and Light Stabilizers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl) benzotriazole, 2-(2'-hydroxy-4'-octyloxyphenyl) benzotriazole, 2-(3',5'-di-tert-amyl-2'-hydroxyphenyl) benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy) carbonylethyl]-2'-hydroxyphenyl)-5-chloro-benzotriazole, 2-(3'-tert-butyl-2'-hydroxy-5'-(2-methoxycarbonylethyl) phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$$\}_2$ where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl) phenyl]benzotriazole; 2-[2'-hydroxy-3'-(1,1,3,3-tetramethylbutyl)-5'-(α,α-dimethylbenzyl) phenyqbenzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tert-butyl-phenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyidithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl) hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl) sebacate, bis(1-octyloxy-2,2,6,6-tetramethylpiperidyl) succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl )-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl) pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis (2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro [4,5]decane, a reaction product of 7,7,9,9-tetramethyl-2-cycloundecyl-1-oxa-3,8-diaza-4-oxospiro [4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl) hexamethylenediamine, diester of 4-methoxy-methylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-a-olefin-copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubsfituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyl-oxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis (2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-pheny]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethyl phenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenyihydrazide, N,N'-diacetyladipoyl dihydrazide, N,N'-bis(salicyloyl) oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 2,2',2"-nitrilo[triethyltris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite.

Especially preferred are the following phosphites:

Tris(2,4-di-tert-butylphenyl) phosphite, tris(nonylphenyl) phosphite,

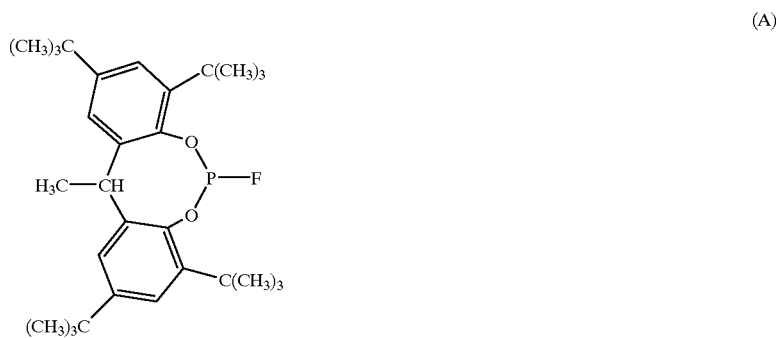
(A)
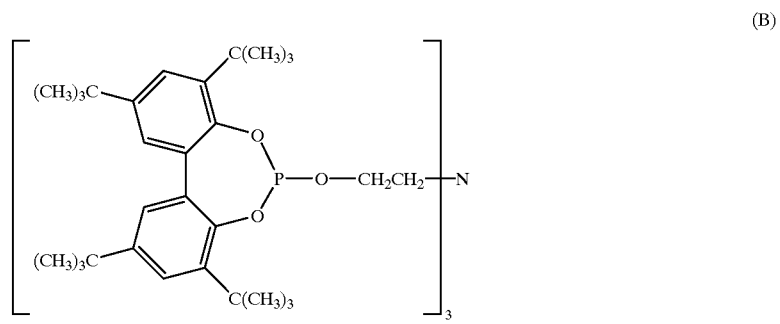
(B)
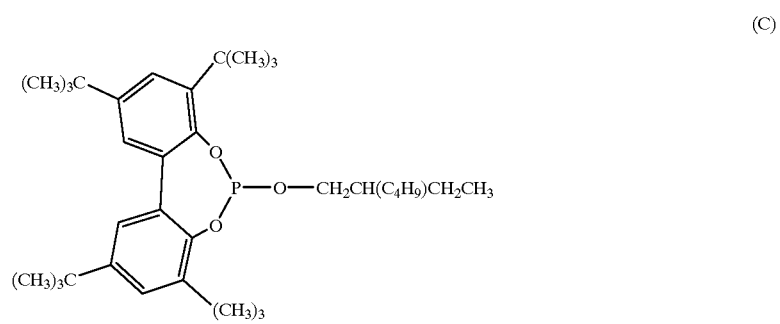
(C)
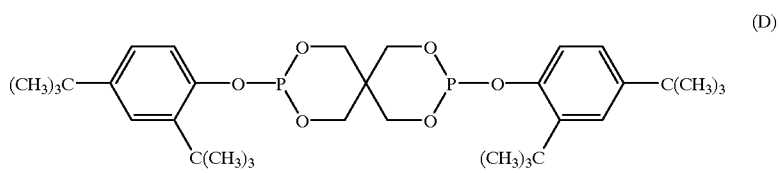
(D)
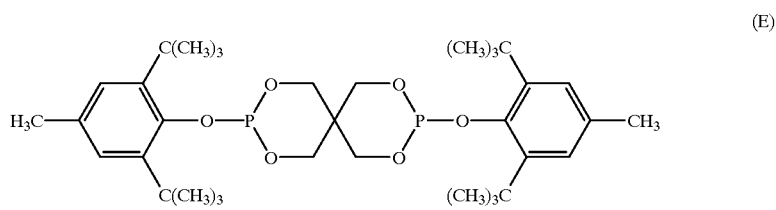
(E)
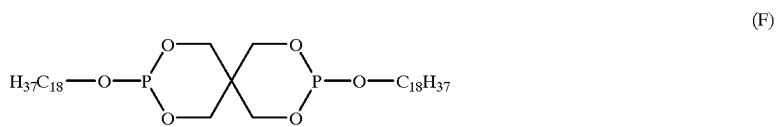
(F)

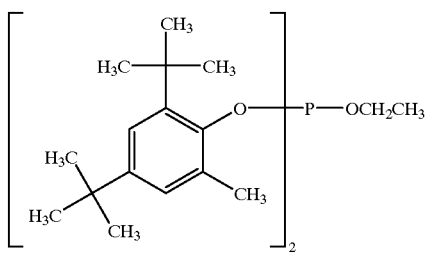

(G)

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example N-benzyl-alpha-phenyl-nitrone, N-ethyl-alph-methyl-nitrone, N-octyl-alpha-heptyl-nitrone, N-lauryl-alpha-undecyl-nitrone, N-tetradecyl-alpha-tridcyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, for example dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilisers, for example copper salts in combination with iodides and/or phosphorus compounds and salts of divalent manganese.

10. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example, calcium stearate, zinc stearate, magnesium behenate, magnesium stearate, sodium ricinoleate and potassium palmitate, antimony pyrocatecholate or zink pyrocatecholate.

11. Nucleating agents, for example inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers).

12. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one.

The standard additives are added, for example, in concentrations of 0.01 to 10%, based on the total weight of the material to be stabilised.

The incorporation of the products and optional further additives into the organic material is carried out by known methods, for example by admixing or applying the products and optionally further additives by methods customarily used in the technology. In the case of polymers, in particular synthetic polymers, the incorporation can be carried out before or during moulding or also by applying the dissolved or dispersed products to the polymer, with or without subsequent evaporation of the solvent. Elastomers can also be stabilised as latices. It is also possible to incorporate the novel products into the polymers by adding them before, during or immediately after the polymerisation of the corresponding monomers or before crosslinking. The novel products can in this case be added as such or also in encapsulated form (e.g. in waxes, oils or polymers). Where the addition is carried out before or during polymerisation, the novel products can also serve as regulators for the chain length of the polymers (chain terminators). The novel products can also be added to the materials to be stabilised in the form of a masterbatch containing them, for example, in a concentration of 2.5 to 25% by weight.

The materials stabilised in this manner can be used in a very wide range of forms, for example in the form of foils, fibres, tapes, moulding compositions, profiles or as binders for paint systems, adhesives or putties.

This invention also relates to compositions comprising a functional liquid, preferably from the series of the lubricants, the hydraulic liquids and the metal working liquids, as well as fuels for driving motors of the 4-stroke otto cycle, 2-stroke otto cycle, diesel, Wankel and orbital type, and at least one product obtainable by reacting compounds of formula I with compounds of formula IIa or/and IIb and IIIa or/and IIIb and additionally, where appropriate, IV.

The products obtainable according to this invention can be used preferably in lubricants and fuels as multifunctional stabilisers, i.e. they combine antioxidative, friction-reducing, high-pressure and antiwear protection as well as anticorrosive properties.

Preferred lubricants and fuels as well as related products are motor oils, turbine oils, gear oils, hydraulic liquids, diesel or motor fuels, metal working liquids and lubricating greases.

Particularly preferred lubricants are mineral oils, the synthetic oils, or mixtures thereof.

Functional liquids from the series of the lubricants, hydraulic liquids and metal working liquids are the products known per se.

The suitable lubricants and hydraulic liquids are known to skilled person and are described in the relevant literature, inter alia in Dieter Klamann, "Schmierstoffe and verwandte Produkte" (Verlag Chemie, Weinheim, 1982), in Schewe-Kobek, "Das Schmiermittel-Taschenbuch" (Dr. Alfred H üthig-Verlag, Heidelberg, 1974) and in "Ullmanns Enzykiopadie der technischen Chemie", Vol.13, pages 85–94 (Verlag Chemie, Weinheim, 1977).

The lubricants are, in particular, oils and greases, based for example on a mineral oil. The use of oils is preferred.

Another group of lubricants which may be used are vegetable or animal oils, fats, tallows and waxes or mixtures thereof with one another, or mixtures with the cited mineral or synthetic oils.

Vegetable and animal oils, fats, tallows and waxes are, for example, palmnut oil, palm oil, olive oil, beet oil, rapeseed oil, linseed oil, groundnut oil, soybean oil, cottonseed oil, sunflower oil, pumpkinseed oil, coconut oil, corn oil, castor oil, walnut oil and mixtures thereof, fish oils, tallows of slaughter animals, such as beef tallow, neat's foot oil and bone fat as well as their modified, epoxidised and sulfoxidised forms, for example epoxidised soybean oil.

The mineral oils are based, in particular, on hydrocarbon compounds.

Typical examples of synthetic lubricants include lubricants based on aliphatic or aromatic carboxylates, polymeric esters, polyalkylene oxides, phosphates, poly-alpha-olefins or silicones, on a diester of a divalent acid with a monovalent alcohol, such as dioctylsebacate or dinonyladipate, on a triester of trimethylolpropane with a monovalent acid or with a mixture of such acids, for example trimethylolpropanetripelargonate, trimethylolpropanetricaprylate or mixtures thereof, on a tetraester of pentaerythritol with a monovalent acid or with a mixture of such acids, for example pentaerythritoltetracaprylate, or on a complex ester of monovalent and divalent acids with polyvalent alcohols, e.g. a complex ester of trimethylolpropane with caprylic and sebacic acid or on a mixture thereof. Particularly suitable are, besides mineral oils, e.g. poly-alpha-olefins, ester-based lubricants, phosphates, glycols, polyglycols and polyalkylene glycol, as well as their mixtures with water.

Metal working liquids and hydraulic liquids can be prepared on the basis of the same substances as those described above for the lubricants. They are often also emulsions of such substances in water or other liquids.

The lubricant and fuel compositions of this invention are used, for example, in combustion motors, e.g. in automobiles which are equipped, for example, with motors of the otto cycle, diesel, two-stroke, Wankel or orbital type.

The products obtainable according to this invention are readily soluble in lubricants and fuels, metal working and hydraulic liquids and are therefore particularly suitable as additives to lubricants and fuels, metal working and hydraulic liquids.

The novel products are effective already in very small amounts as additives in lubricants. They are usefully admixed to the lubricants in an amount of 0.01 to 5% by weight, preferably in an amount of 0.05 to 3% by weight and, very particularly preferably, in an amount of 0.1 to 2% by weight, based on the lubricant.

The products obtainable according to this invention can be admixed to the lubricants and fuels in a manner known per se. The compounds are, for example, readily soluble in oils. It is also possible to prepare a so-called masterbatch which, depending on the consumption, may be diluted with the corresponding lubricant and fuel to use concentrations. In such cases it is also possible to use concentrations of more than 1% by weight.

The lubricants and fuels, metal working and hydraulic liquids can additionally contain other additives which are added to further improve their basic properties. These additives include: other antioxidants, metal passivisers, rust inhibitors, viscosity index improvers, pour point depressants, dispersants, detergents, friction reducers, other high-pressure and antiwear additives. Such additional additives are usefully added in an amount of 0.01 to 5% by weight.

A number of such compounds is to be found, for example, in the above list "1. Antioxidants", in particular in items 1.1 to 1.19. Other examples of additives are to be mentioned additionally:

Example of other antioxidants:

Aliphatic or aromatic phosphites, esters of thiodipropionic acid or of thiodiacetic acid, or the salts of the dithiocarbamide acid or dithiophosphoric acid, 2,2,12,12-tetramethyl-5,9-dihydroxy-3,7,11-trithiatridecane and 2,2,15,15-tetramethyl-5,12-dihydroxy-3,7,10,14-tetrathiahexadecane.

Examples of metal deactivators, e.g. for copper, are:

a) benzotriazoles and their derivatives, e.g. 2-mercaptobenzotriazole, 2,5-dimercaptobenzotriazole, 4- or 5-alkylbenzotriazoles (e.g. tolutriazole) and their derivatives, 4,5,6,7-tetrahydrobenzotriazole, 5,5'-methylenebisbenzotriazole; Mannich bases of benzotriazole or tolutriazole, such as 1-[di(2-ethylhexyl)aminomethyl) tolutriazole and 1-[di(2-ethylhexyl)aminomethyl) benzotriazole; alkoxyalkylbenzotriazole, such as 1-(nonyloxymethyl)benzotriazole, 1-(1-butoxyethyl) benzotriazole and 1-(1-cyclohexyloxybutyl)tolutriazole.

b) 1,2,4-triazoles and their derivatives, e.g. 3-alkyl- (or aryl)-1,2,4-triazoles, Mannich bases of 1,2,4-triazoles, such as 1-[di(2-ethylhexyl)aminomethyl-1,2,4-triazole; alkoxyalkyl-1,2,4-triazoles, such as 1-(1-butoxyethyl-1,2,4-triazole; acylated 3-amino-1,2,4-triazoles.

c) imidazole derivatives, e.g. 4,4'-methylenebis(2-undecyl-5-methylimidazole, bis[(N-methyl)imidazol-2-yl] carbinoloctyl ether.

d) sulfur-containing heterocyclic compounds, e.g. 2-mercaptobenzothiazole, 2,5-dimercapto-1,3,4-thiadiazole, 2,5-dimercaptobenzothiadiazole and their derivatives; 3,5-bis[di(2-ethylhexyl)aminomethyl]-1,3,4-thiadiazolin-2-one.

e) amino compounds, e.g. salicylidene/propylenediamine, salicylaminoguanidine and their salts.

Examples of rust inhibitors are:

a) organic acids, their esters, metal salts, amine salts and anhydrides, e.g. alkyl succinic acid and alkenyl succinic acid and their partial esters with alcohols, diols or hydroxycarboxylic acids, partial amides of alkyl succinic acid and alkenyl succinic acid, 4-nonylphenoxy acetic acid, alkoxy carboxylic acids and alkoxyethoxy carboxylic acids, such as dodecyloxy acetic acid, dodecyloxy(ethoxy)acetic acid and their amine salts, and also N-oleoylsarcosine, sorbitan monooleate, lead napthenate, alkenysuccinic acid anhydrides, e.g. dodecenylsuccinic acid anhydride,2-(2-carboxyethyl)-1-dodecyl-3-methyglycerol and the salts thereof, in particular the sodium and triethanolamine salts.

b) nitrogen-containing compounds, for example:
  i. primary, secondary or tertiary aliphatic or cycloaliphatic amines and amine salts of organic and inorganic acids, e.g. oil-soluble alkylammonium carboxylates, and also 1[N,N-bis(hydroxyethyl)amino]-3-(4-nonylphenoxy)propan-2-ol.
  ii. heterocyclic compounds, for example: substituted imidazolines and oxazolines, 2-heptadecenyl-1-(2-hydroxyethyl)imidazoline.

c) phosphorous-containing compounds, for example: the amine salts of phosphoric acid partial esters or phosphonic acid partial esters, zinc dialkyldithiophosphates.

d) sulfur-containing compounds, for example: barium dinonylnaphthalene sulfonates, calcium petroleum sulfonates, alkythio-substituted aliphatic carboxylic acids, esters of aliphatic 2-sulfocarboxylic acids and the salts thereof.

e) glycerol derivatives, for example: glycerol monooleate, 1-(alkylphenoxy)-3-(2-hydroxyethyl)glycerols, 1-(alkylphenoxy)-3-(2,3-dihydroxypropyl)glycerols, 2-carboxyalkyl-1,3-dialkylglycerols.

Example of viscosity index improvers are:
Polyacrylates, polymethacrylates, vinylpyrrolidone/methacrylate copolymers, polyvinyl pyrrolidones, polybutenes, olefin copolmers, styrene/acrylate copolymers, polyethers.

Examples of pour point depressants are:
Poly(methacrylates, ethylene vinyl acetate copolymers, alkylpolystyrenes fumarate copolymers, alkylated naphthalene derivatives.

Examples of dispersants/surfactants are:
Polybutenyl succinic acid amides or polybutenyl succinic acid imides, polybutenyl phosphonic acid derivatives, basic magnesium sulfonates, calcium sulfonates and barium sulfonates, and basic magnesium phenolates, calcium phenolates and barium phenolates.

Examples of high pressure and antiwear additives are:
Sulfur- and/or phosphorous-and/or halogen-containing compounds, for example chlorinated parafins, sulfurated olefins or vegetable oils (soybean/rapeseeds oil) alkyl- or aryl-di- or trisulfides, zinc dialkyldithiophosphates, zinc dithiocarbamates, such as zinc diamyldithiocarbamate molybdenum phosphorous dithioates, such as molybdenum phosphorous dithiocarbamtes, triarylphosphates, such as tritoyl phosphate, tricesyl phosphate, phenylphosphate isopropyl ester, the amine salts of mono- or diaalkylphosphoric acids, such as the amine salts of mono/di-hexylphosphate, the amine salts of alkylphosphonic acids, such as the amine salt of methylphosphonic acid, triarylphosphites, such as tris[nonylphenyq]phosphite, dialkylphosphites, such as dioctylphosphite, triarylmonothiophosphates, such as triphenylthionophosphate or tris[isononylphenyl]thionophosphate or tert-butylated triphenylthionophosphate, substituted trialkylmono- or -dithiophosphates, such as diisopropoxyphosphinothioyl)thiolpropionate or butylene-1,3-bis[(diisobutoxyphosphinothioyl)propionate, trithiophosphates, such as trithiophosphoric acid S,S,S-tris (isooctyl-2-acetates), the amine salts of 3-hydroxy-1,3-thiaphosphetane-3-oxide, benzotriazoles or their derivatives, such as bis(2-ethylhexyl) aminomethyltolutriazole, dithiocarbamates, such as methylenebisdibutyidithiocarbamate, derivatives of 2-mercaptobenzothiazole, such as 1-[N,N-bis(2-ethylhexyl)aminomethyl]-2-mercapto-1H-1,3-benzothiazole, derivatives of 2,5-dimercapto-1,3,4-thiadiazole, such as 2,5-bis (tert-nonyldithio)-1,3,4-thiadiazole. Examples of friction reducers are:

Oleo oil, oleic acid, tallow, rapeseed oil, sulfurised fats, amine. Other examples are mentioned in EP-A-0 565 487. Examples of special additives for use in water/oil metal working and hydraulic liquids are:

Emulsifiers: petroleum sulfonate, amines, such as polyoxyethylated fatty amines, nonionic surface-active substances.

Buffers: alkanolamines.

Biocides: triazines, thiazolinones, trisnitromethane, morpholine, sodium pyridenethol.

Speed improvers: calcium sulfonates and barium sulfonates.

Examples of fuel additives:
Fuel additives are described in Kirk-Othmer, Encyclopedia of Chemical Technology, Vol 12, 1994. In this connection they will be mainly benzine and diesel additives:

Benzine: dyes, in particular azo dyes.

Antioxidants: aminic, in particular para-phenylendiamines, or phenolic, e.g. 2,6-di-tert-butylphenol, as described above.

Metal deactivators: in particular N,N'-disalicylidene-1,2-propane, benzotriazole, EDTA.

Rust inhibitors: for example carboxylic acids, sulfonates, amines or amine salts.

Dispersants: e.g. esters, high molecular weight amines, Mannich bases, succinimides, borated succinimides.

Detergents: for example fatty acid amides, nonpolymeric amines, polybutenesuccinimides, polyetheramines, low molecular weight amines, sulfonates, salicylic acid derivatives.

Demulgators: for example long-chain alcohols or phenols with polyethylene or polybutylene groups.

Antiknock agents: tetralkyl lead, manganese methylcyclopentadienyltricarbonyl.

Oxygen compounds: esters of vegetable oils, ethers, alcohols for improving the burning behaviour.

Diesel: ignition improvers (cetane improvers), e.g. alkyl nitrates, ether nitrates, alkyldiglycol nitrates, organic peroxides.

Stabilisers, in particular, crack diesel: amines and other nitrogen-containing compounds which serve as radical interceptors.

Especially preferred additional additives in lubricants are aminic antioxidants, in particular mixtures of mono- and dialkylated tert-butyl/tert-octyidiphenylamines.

This invention also relates to the use of the products obtainable according to this invention for stabilising organic materials, in particular as additives in lubricants and fuels, hydraulic or metal working liquids, preferably in hydraulic and gear oils. The use according to this invention includes protecting the metal parts to be lubricated from mechanical wear (antiwear protection) as well as anticorrosive and antioxidative effects, based on the lubricant as well as on the metal parts.

The invention therefore also relates to a process for improving the performance properties of organic materials, in particular lubricants and fuels, metal working and hydraulic liquids, which comprises adding thereto the products obtainable according to this invention.

It is also possible to prepare concentrates comprising an oleophilic solvent and at least one product of this invention.

The invention is illustrated by the following Examples. Parts and percentages are by weight, unless otherwise stated.

EXAMPLE 1

Product prepared from methyl 3-(3'-tert-butyl-4'-hydroxy-5'-methylphenyl)propionate, diethanolamine and methyl oleate.

A mixture of 25.0 g (0.10 mol) of methyl 3-(3'-tert-butyl-4'-hydroxy-5'-methylphenyl)propionate and 13.14 g (0.125 mol) of diethanolamine is stirred in a sulfonation flask, equipped with a sloping condenser, for 2 hours at 200 mbar and 150° C. Excess diethanolamine is then removed by distillation under high vacuum at about 100° C. After cooling the reaction mixture to room temperature, it is charged with 29.7 g (0.10 mol) of methyl oleate and 0.10 g of lithium amide and stirred for 4 hours at 120° C. The evolving methanol is continuously removed by distillation. The reaction mixture is cooled and diluted with about 200 ml of toluene and 200 ml of water. The water phase is separated and extracted twice with toluene. The organic phases are combined, dried over sodium sulfate and concentrated in a vacuum rotary evaporator, resulting in 60.2 g of a brown oil, the main component of which comprises a compound of formula 101

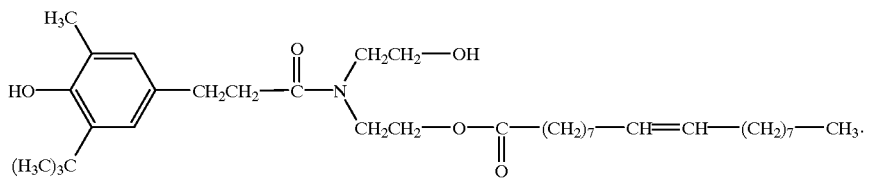

(101)

Elemental analysis calculated for the compound of formula (101): C: 73.55; H: 10.46, N: 2.38%. Found: C: 72.70; H: 10.55; N: 2.68%.

EXAMPLE 2

Product prepared from methyl 3-(3',5'-di-tert-butyl-4'-hydroxyphenyl)propionate, diethanolamine and stearic acid.

A mixture of 56.9 g (0.20 mol) of stearic acid and 21.03 g (0.20 mol) of diethanolamine is stirred in a sulfonation flask, equipped with a sloping condenser, for 2 hours at 150° C. After cooling the reaction mixture to 120° C., it is charged with a solution consisting of 58.1 g (0.20 mol) of methyl 3-(3',5'-di-tert-butyl-4'-hydroxyphenyl)propionate in 60 ml of toluene and the residual water of reaction is removed by azeotropic distillation. The reaction mixture is then charged with 0.20 g of lithium amide and stirred for 5 hours at 130° C. The evolving methanol is continuously removed by distillation. The reaction mixture is cooled and diluted with about 200 ml of toluene and 200 ml of water. The water phase is separated and extracted twice with toluene. The organic phases are combined, dried over sodium sulfate and concentrated in a vacuum rotary evaporator, resulting in 85.9 g of a brown oil, the main component of which comprises a compound of formula 102

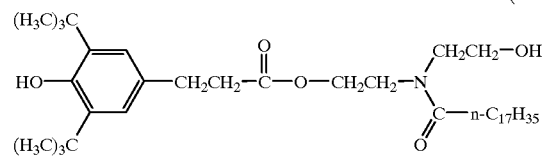

(102)

Elemental analysis calculated for the compound of formula (102): C: 73.86; H: 10.93; N: 2.27%. Found: C: 74.07; H: 11.05; N: 2.10%.

EXAMPLE 3

Product prepared from pentaerythritol-tetrakis[3-(3',5'-di-tert-butyl-4'-hydroxyphenyl)propionate, diethanolamine and methyl oleate.

A mixture of 117.8 g (0.10 mol) of pentaerythritol-tetrakis [3-(3',5'-di-tert-butyl-4'-hydroxyphenyl)propionate [Irganox®1010, Ciba Spezialitaitenchemie AG] and 10.5 g (0.10 mol) of diethanolamine is stirred in a sulfonation flask, equipped with a sloping condenser, for 6 hours at 130 to 135° C. The melt is then charged with 89.0 g (0.30 mol) of methyl oleate and 0.2 g of lithium amide and stirred for 5 hours at 130° C. The evolving methanol is continuously removed by distillation. The reaction mixture is cooled and diluted with about 200 ml of toluene and 200 ml of water. The water phase is separated and extracted twice with toluene. The organic phases are combined, dried over sodium sulfate and concentrated in a vacuum rotary evaporator, resulting in 196.1 g of a brown oil with products having the empirical formula $C_{93}H_{143}NO_{13}$. Elemental analysis calculated: C: 74.64; H: 10.50; N: 0.65%. Found: C: 74.53; H: 10.01; N: 0.73%.

EXAMPLE 4

Product prepared from methyl 3-(3',5'-di-tert-butyl-4'-hydroxyphenyl)propionate, diethanolamine and methyl oleate.

A mixture of 29.2 g (0.10 mol) of methyl 3-(3',5'-di-tert-butyl-4'-hydroxyphenyl)propionate and 13.14 g (0.125 mol) of diethanolamine is stirred in a sulfonation flask, equipped with a sloping condenser, for 2 hours at 200 mbar and 150° C. Excess diethanolamine is removed by distillation under high vacuum at about 100° C. After cooling the reaction mixture to 100° C., it is charged with 29.7 g (0.10 mol) of methyl oleate and heated to 125° C. Subsequently, 0.10 g of lithium amide are added and the reaction mixture is stirred for 4 hours at 125° C. The evolving methanol is continuously removed by distillation. The reaction mixture is cooled and diluted with about 200 ml of toluene and 200 ml of water. The water phase is separated and extracted twice with toluene. The organic phases are combined, dried over sodium sulfate and concentrated in a vacuum rotatary evaporator, resulting in 64.3 g of a brown oil, the main component of which comprises a compound of formula 104

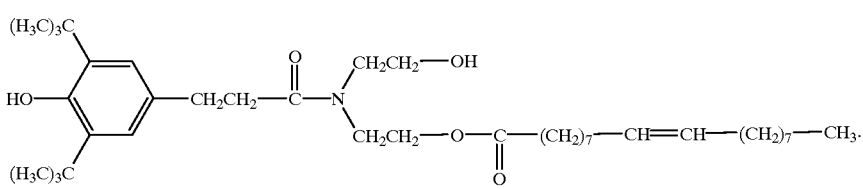

(104)

Elemental analysis calculated for the compound of formula (104): C: 74.36; H : 10.72, N: 2.22%. Found: C: 73.45; H: 10.74; N: 2.27%.

EXAMPLE 5

Stabilising oils.

The thermostability of oils is determined by the HPDSC method ("High Pressure Differential Scanning Calorimetry"). The test oil (synthetic motor oil M251®, of Shell, Germany, having a phosphorus component of 0.08%) is charged with 1.0% of stabiliser of Table 1. A sample crucible containing 45 mg of this solution is positioned on a DSC sensor (DSC27HP apparatus, of Mettler-Toledo AG, Greifensee, Switzerland). The closed cell is Ihroroughly flushed several times with the reaction gas oxygen and is placed under a pressure of 8 bar. The temperature is raised at a heating rate of 50° C. per minute from room temperature to the required reaction temperature of 200° C. The induction time until the start of the visible degradation of the oil is measured. The higher the induction time, the better stabilised the oil. The results are compiled in Table 1.

TABLE 1

| Example | Stabiliser (product acc. to Example) | Induction time in minutes |
|---|---|---|
| 5a[a)] | — | 21 |
| 5b[b)] | 1.0% Example 1 | 33 |
| 5c[b)] | 1.0% Example 4 | 38 |

[a)]Comparison Example.
[b)]Example according to this invention.

What is claimed is:

1. A product, which is obtained by reacting compounds of formula I with compounds of formula IIa or/and IIb and IIIa or/and IIIb additionally, where appropriate, IV

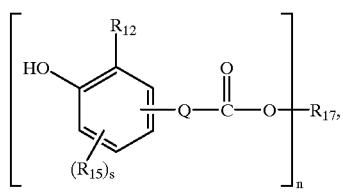

(I)

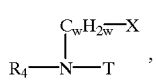

(IIa)

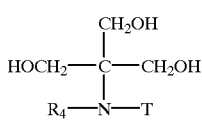

(IIb)

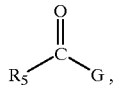

(IIIa)

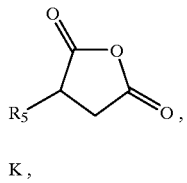

(IIIb)

K,  (IV)

wherein in the compound of formula I $R_{12}$ is $C_1$–$C_{12}$alkyl, $C_5$–$C_{12}$cycloalkyl, phenyl or $C_7$–$C_9$phenylalkyl, $R_{15}$ is hydrogen, $C_1$–$C_{18}$alkyl, $C_5$–$C_{12}$cycloalkyl, phenyl or $C_7$–$C_9$phenylalkyl, Q is —$C_mH_{2m}$—,

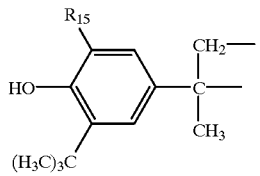

or —$(CH_2)_a$—S—$(CH_2)_b$—, a is a number from 0 to 3, b is 1 or 2, m is a number from 0 to 3, n is a number from 1 to 6, s is 0, 1 or 2, and if n=1, $R_{17}$ is hydrogen, $C_1$–$C_{45}$alkyl, $C_5$–$C_{12}$cycloalkyl, $C_2$–$C_{18}$alkenyl, —$CH_2CH_2$—$R_{10}$—$R_1$ or —$[(CH_2)_p$—O$]_q$—$(CH_2)_p$—O—$R_1$, $R_1$ is hydrogen, $C_1$–$C_{24}$alkyl or $C_5$–$C_{12}$cycloalkyl, $R_{10}$ is oxygen, sulfur or >N—$R_2$, $R_2$ is $C_1$–$C_{18}$alkyl; phenyl which is unsubstituted or substituted by $C_1$–$C_{18}$alkyl, hydroxy or methoxy, p is 2, 3 or 4, q is a number from 2 to 20, and if n=2, $R_{17}$ is a divalent hexose radical or hexite radical,

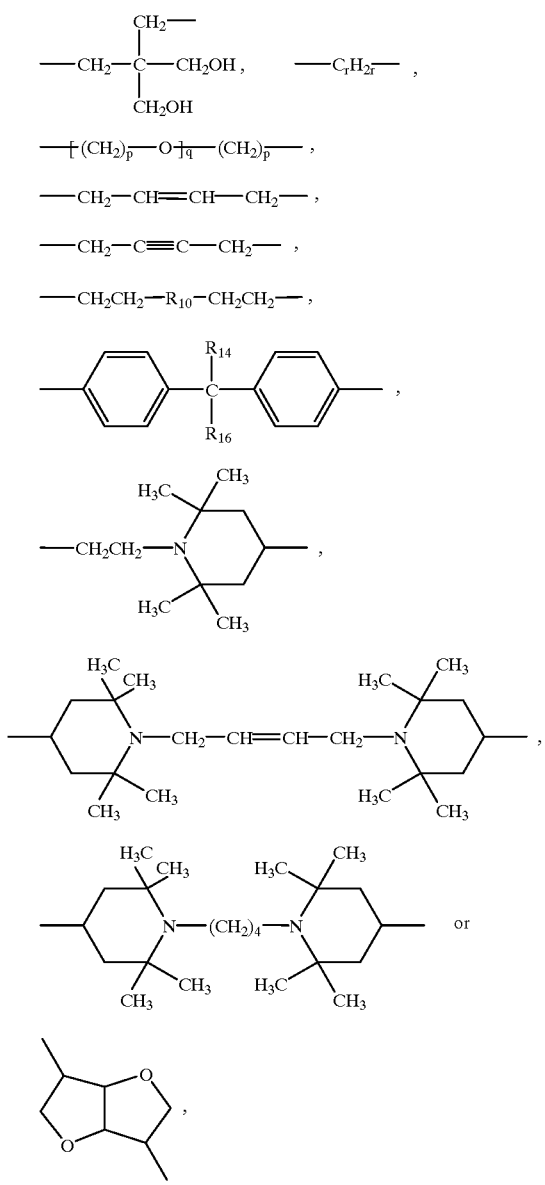

$R_{10}$ is oxygen, sulfur or >N—$R_2$,
$R_{14}$ and $R_{16}$ are each independently of the other hydrogen or $C_1$–$C_{12}$alkyl, or $R_{14}$ and $R_{16}$, together with the linking carbon atom, are a $C_5$–$C_8$cycloalkylidene ring,
r is a number from 2 to 10, and
if n=3,
$R_{17}$ is a trivalent hexose radical or hexite radical,

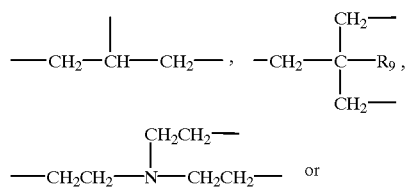

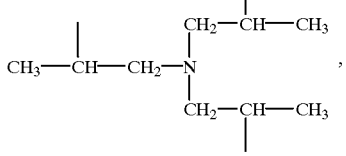

$R_9$ is hydrogen, —$CH_2OH$ or $C_1$–$C_4$alkyl, and
if n=4,
$R_{17}$ is a tetravalent hexose radical or hexite radical, $C_4$–$C_{10}$alkanetetrayl,

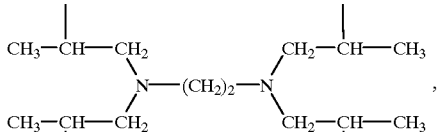

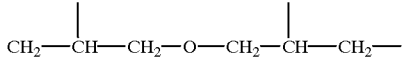

and
if n=5,
$R_{17}$ is a pentavalent hexose radical or hexite radical, and
if n=6,
$R_{17}$ is

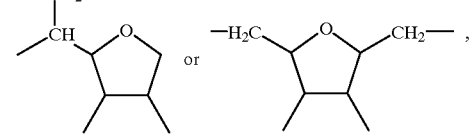

in the compounds of formula IIa and IIb
$R_4$ is hydrogen, $C_1$–$C_{18}$alkyl, unsubstituted or $C_1$–$C_2$alkyl-substituted phenyl; —$C_wH_{2w}$—OH or —$C_wH_{2w}$—$NH_2$,
X is hydroxy, —$NH_2$ or

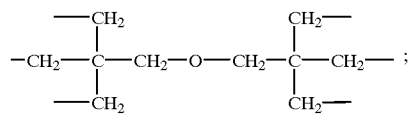

$R_{13}$ is hydroxy or —$NH_2$,
Y is oxygen or >NH,
c is a number from 0 to 6,
w is a number from 2 to 6,
T is hydrogen or —$C_wH_{2w}$—X, with the proviso that at least one >NH group each is present in the compounds of formula IIa and IIb;
in the compounds of formula IIIa and IIIb
G is chloro, bromo or —$OR_6$,
$R_5$ is hydrogen, $C_1$–$C_{30}$alkyl, $C_8$–$C_{30}$alkenyl, phenyl, $C_7$–$C_9$phenylalkyl, $C_5$–$C_{12}$cycloalkyl, —$C_dH_{2d}$—S—$R_8$, $C_8$–$C_{22}$hydroxyalkenyl,

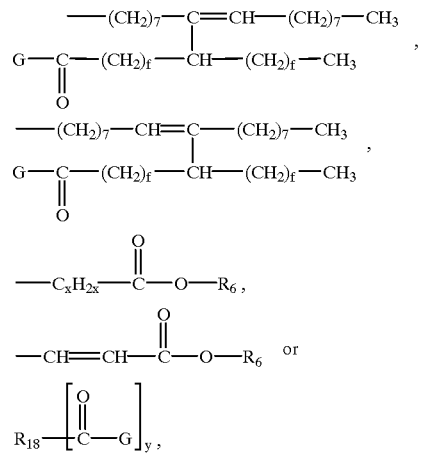

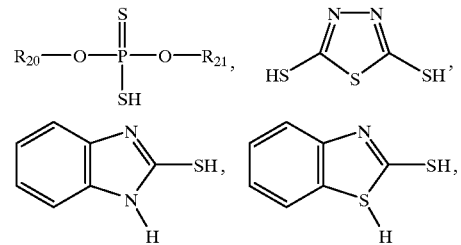

$R_6$ is hydrogen, $C_1$–$C_{18}$alkyl, $C_8$–$C_{30}$alkenyl, $C_5$–$C_{12}$cycloalkyl, phenyl or $C_7$–$C_9$phenylalkyl, $R_8$ is $C_4$–$C_{12}$alkyl, phenyl or $C_5$–$C_8$cycloalkyl, d is, 0, 1, 2or 3, f is 7or 8, x is a number from 2 to 8, y is 3 or 4, and if y=3, $R_{18}$ is $C_3$–$C_{18}$alkanetriyl or $C_6$–$C_8$cycloalkanetriyl, and if y=4, $R_{18}$ is $C_3$–$C_{18}$alkanetetrayl or $C_6$–$C_8$cycloalkanetetrayl, and in the compound of formula IV K is sulfur, $R_{19}$—SH,

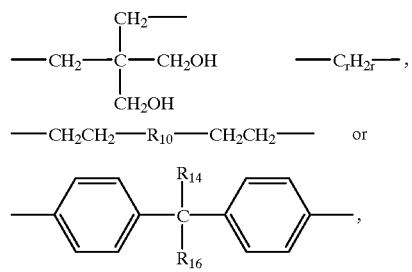

$C_{12}$–$C_{30}$alkane or $C_{18}$–$C_{36}$phenylalkane, $R_{19}$ is $C_1$–$C_{18}$alkyl, $C_7$–$C_{24}$phenylalkyl, phenyl, $C_7$–$C_{24}$alkylphenyl, unsubstituted or $C_1$–$C_4$alkyl-substituted $C_5$–$C_{12}$cycloalkyl; and $R_{20}$ and $R_{21}$ are each independently of the other $C_1$–$C_{18}$alkyl, unsubstituted or $C_1$–$C_{18}$alkyl-substituted phenyl.

2. A product according to claim 1, wherein in the compound of formula I $R_{12}$ is $C_1$–$C_8$alkyl, cyclohexyl or phenyl, $R_{15}$ is hydrogen, $C_1$–$C_{12}$alkyl, cyclohexyl or phenyl, Q is —$C_mH_{2m}$— or —$(CH_2)_a$—S—$(CH_2)_b$—, a is 1, b is 1, m is 2, n is a number from 1 to 4, s is 1 or 2, and if n=1, $R_{17}$ is hydrogen, $C_1$–$C_{18}$alkyl, cyclohexyl, allyl, —$CH_2CH_2$—$R_{10}$—$R_1$ or

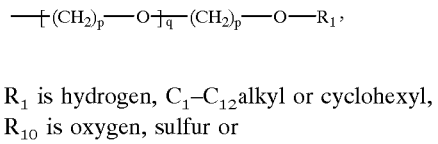

$R_1$ is hydrogen, $C_1$–$C_{12}$alkyl or cyclohexyl, $R_{10}$ is oxygen, sulfur or

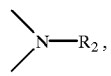

$R_2$ is $C_1$–$C_{12}$alkyl or phenyl, p is 2 or 4, q is a number from 2 to 10, and if n=2, $R_{17}$ is a divalent hexose or hexite radical,

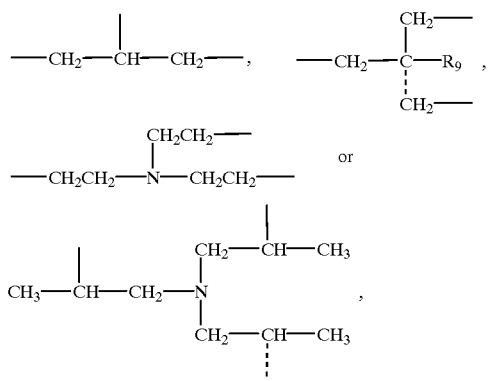

$R_{10}$ is oxygen, sulfur or,

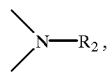

$R_{14}$ and $R_{16}$ are each independently of the other hydrogen or $C_1$–$C_{12}$alkyl, or $R_{14}$ and $R_{16}$, together with the linking carbon atom, form a cyclohexylidene ring, r is a number from 2 to 10, and if=3, $R_{17}$ is a trivalent hexose or hexite radical, $R_9$ is hydrogen, —$CH_2OH$ or $C_1$–$C_4$alkyl, and if n=4, $R_{17}$ is a tetravalent hexose or hexite radical, $C_4$–$C_{10}$alkanetetrayl or

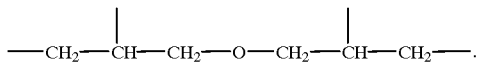

3. A product according to claim 1, wherein in the compound of formula I
$R_{12}$ is tert-butyl,
$R_{15}$ is $C_1$–$C_4$alkyl and is bound in ortho-position to the OH-group,
Q is —$C_mH_{2m}$— or —$(CH_2)_a$—S—$(CH_2)_b$—,
a is 1,
b is 1,
m is 2,
n is 1 or 4,
s is 1, and
if n=1,
$R_{17}$ is $C_1$–$C_{18}$alkyl, and
if n=4,
$R_{17}$ is

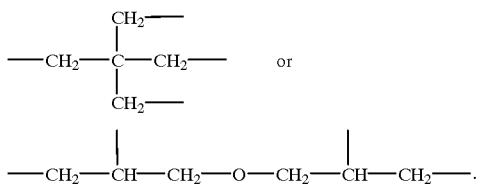

4. A product according to claim 1, wherein in the compounds of formulae IIa and IIb
$R_4$ is hydrogen, $C_1$–$C_{12}$alkyl, unsubstituted or $C_1$–$C_4$alkyl-substituted phenyl; —$C_wH_{2w}$—OH or —$C_wH_{2w}$NH$_2$,
X is hydroxy, —NH$_2$ or

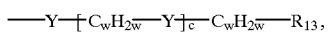

$R_{13}$ is hydroxy or —NH$_2$,
Y is oxygen or

c is a number from 0 to 4,
w is a number from 2 to 4,
T is hydrogen or —$C_wH_{2w}$—X, with the proviso that at least one

group is present in the compound of formulae IIa and IIb.

5. A product according to claim 1, wherein in the compounds of formulae IIIa and IIIb
G is —OR$_6$,
$R_5$ is hydrogen, $C_1$–$C_{18}$alkyl, $C_8$–$C_{22}$alkenyl, phenyl, benzyl, cyclohexyl, $C_8$–$C_{22}$hydroxyalkenyl,

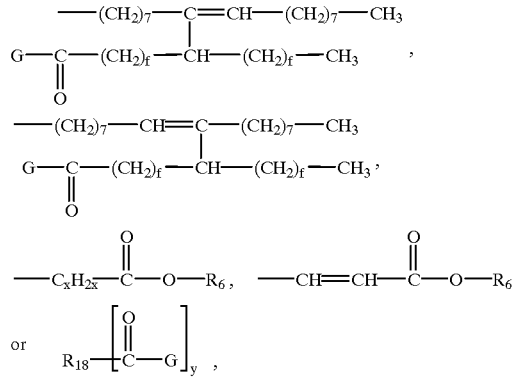

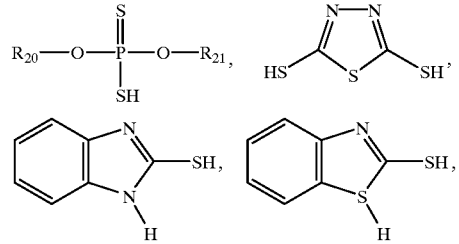

$R_6$, is hydrogen, $C_1$–$C_{18}$alkyl, $C_8$–$C_{22}$alkenyl, cyclohexyl, phenyl or benzyl,
f is 7 or 8,
x is a number from 2 to 6,
y is 3 or 4, and
if y=3,
$R_{18}$ is $C_3$–$C_{12}$alkanetriyl or cyclohexantriyl, and
if y=4,
$R_{18}$ is $C_3$–$C_{12}$alkanetetrayl or cyclohexantetrayl.

6. A product according to claim 1, wherein in the compound of formula IV
K is sulfur, $C_2$–$C_{30}$alkane or $C_{18}$–$C_{36}$phenylalkane, and
$R_{20}$ and $R_{21}$ are each independently of the other $C_1$–$C_{12}$alkyl, unsubstituted or $C_1$–$C_4$alkyl-substituted phenyl.

7. A composition, which comprises
a) an organic material which is subject to oxidative, thermal or light-induced degradation, and
b) at least one product according to claim 1.

8. A composition according to claim 7, wherein component (a) is a lubricant, a fuel, a hydraulic liquid, a metal working liquid, or a synthetic polymer.

9. A composition according to claim 7, wherein component (a) is a motor oil, a turbine oil, a gear oil, a diesel fuel or a lubricating grease.

10. A composition according to claim 7, wherein component (a) is a synthetic polymer.

11. A composition according to claim 7, which additionally comprises further additives besides the components (a) and (b).

12. A concentrate, which comprises an oleophilic solvent and at least one product according to claim 1.

13. A process for stabilising and improving the performance properties of organic materials against oxidative, thermal or light-induced degradation, which comprises adding thereto at least one product according to claim 1.

* * * * *

UNITED STATES PATENT AND TRADEMARK OFFICE
CERTIFICATE OF CORRECTION

PATENT NO. : 6,046,263
DATED : APRIL 4, 2000
INVENTOR(S) : MICHAEL RASBERGER ET AL

It is certified that error appears in the above-identified patent and that said Letters Patent is hereby corrected as shown below:

On the title page, Section [30] should read:

-- [30] Foreign Application Priority Data

May 26, 1997 [CH] Switzerland 1230/97 --.

Signed and Sealed this

Sixth Day of March, 2001

Attest:

NICHOLAS P. GODICI

*Attesting Officer*     *Acting Director of the United States Patent and Trademark Office*